(12) United States Patent
Isii et al.

(10) Patent No.: US 7,457,139 B2
(45) Date of Patent: Nov. 25, 2008

(54) POWER SUPPLY APPARATUS FOR ARC-UTILIZING APPARATUSES

(75) Inventors: Hideo Isii, Osaka (JP); Tetsuro Ikeda, Osaka (JP); Kenzo Danjo, Osaka (JP); Yuji Ikejiri, Osaka (JP)

(73) Assignee: Sansha Electric Manufacturing Company, Limited, Osaka-shi, Osaka-fu (JP)

( * ) Notice: Subject to any disclaimer, the term of this patent is extended or adjusted under 35 U.S.C. 154(b) by 244 days.

(21) Appl. No.: 11/384,845

(22) Filed: Mar. 20, 2006

(65) Prior Publication Data

US 2007/0217231 A1 Sep. 20, 2007

(51) Int. Cl.
*H02M 7/00* (2006.01)
*B23K 9/10* (2006.01)

(52) U.S. Cl. .................. 363/69; 363/65; 219/130.32
(58) Field of Classification Search .................. 363/16, 363/17, 65, 67, 69–71, 97, 131, 132, 95, 363/98; 219/130.1, 130.32, 130.4, 136, 137 R, 219/137 PS
See application file for complete search history.

(56) References Cited

U.S. PATENT DOCUMENTS

| | | | |
|---|---|---|---|
| 5,751,568 A * | 5/1998 | Danjo et al. .................. 363/95 |
| 6,181,576 B1 * | 1/2001 | Ikeda et al. .................. 363/17 |
| 6,269,015 B1 | 7/2001 | Ikeda et al. | |
| 6,847,008 B2 * | 1/2005 | Myers et al. ........... 219/130.51 |
| 6,940,040 B2 * | 9/2005 | Houston et al. ........ 219/130.51 |

FOREIGN PATENT DOCUMENTS

| | | |
|---|---|---|
| CN | 2203512 Y | 7/1995 |
| JP | 08-001350 A | 1/1996 |

OTHER PUBLICATIONS

Notification of the First Office Action issued by The Patent Office Of The People's Republic Of China for Application No. 200610007558.6 dated Apr. 25, 2008.

* cited by examiner

*Primary Examiner*—Matthew V Nguyen
(74) *Attorney, Agent, or Firm*—Duane Morris LLP

(57) ABSTRACT

A power supply apparatus for use with arc-utilizing apparatuses includes a plurality of power supply blocks of the same capacity. Each power supply block includes an input-side rectifying circuit, an inverter, a transformer, and an output-side rectifying circuit. The inverter is controlled by a control circuit in such a manner that high-frequency current flowing the inverter or current flowing through the output-side rectifying circuit can correspond to a reference signal provided by a reference signal generator. The outputs of the output-side rectifying circuits of the power supply blocks are connected in parallel with each other. The values of the reference signals generated by the reference signal generators are made always equal by the action of equipotential lines.

3 Claims, 3 Drawing Sheets

POWER SUPPLY APPARATUS FOR ARC-UTILIZING APPARATUSES

This invention relates to a power supply apparatus for arc-utilizing apparatuses, such as an arc welder and an arc cutter.

BACKGROUND OF THE INVENTION

Manufacturers of arc-utilizing apparatuses are sometimes requested by customers to provide a power supply apparatus for the arc-utilizing apparatus having various output capacities. One example of solutions to such problems is disclosed in Japanese Patent Application Publication JP 08-001350 A laid open to public on Jan. 9, 1996.

According to the invention disclosed in this publication, an inverter-type resistance welder having standard capacity is used. The standard capacity resistance welder uses DC power obtained by converting commercial AC power in a converter circuit. The converted DC power is, then, converted to high-frequency power in an inverter, which, in turn, is coupled to a primary winding of a welder transformer having rectifying circuits in its secondary side. There are also provided an inverter control unit which controls the inverter, a synchronizing signal generating circuit which generates a synchronizing signal from a commercial AC power supply, and communication means. The inverter control unit controls the inverter in synchronization with the synchronizing signal from the synchronizing signal generating circuit.

A plurality of such standard capacity inverter-type resistance welders providing an output capacity corresponding to the output capacity required by a customer are provided, and outputs of the secondary sides of the welder transformers of the respective welders are connected in parallel. The communication means is connected through lines to the communication means of the other inverter-type resistance welders.

One of the inverter-type resistance welders is used as a master welder, and the other inverter-type resistance welders are used as slave welders. The master welder sends a synchronizing signal to the slave welders through the communication means, and the inverters of both the master and slave welders are controlled in synchronization with the synchronizing signal of the master inverter-type resistance welder.

Electromagnetic noise is generated due to arcing in an arc-utilizing apparatus. Accordingly, if the technique disclosed in JP 08-001350 A is employed for arc-utilizing apparatuses, electromagnetic noise may cause erroneous operation of the communication means, and, therefore, means to prevent such erroneous operation must be provided, which requires some costs.

An object of the present invention is to provide a power supply apparatus for arc-utilizing apparatuses, which employs unit-forming power supply blocks of standard capacity so as to meet various output capacities required by customers, but not includes communication means like the one described above for realizing the purpose.

SUMMARY OF THE INVENTION

According to an embodiment of the present invention, a power supply apparatus for arc-utilizing apparatuses includes a plurality of power supply blocks having the same capacity. The power supply blocks have the same configuration, and each includes an AC-to-DC converting means for converting commercial AC power to DC power, DC-to-high-frequency converting means for converting the resulting DC power to high-frequency power, a transformer for transforming the resulting high-frequency power, and high-frequency-to-DC converting means for converting the transformed high-frequency power to DC power. The DC-to-high-frequency converting means is controlled by control means in such a manner that the current flowing therethrough or the current flowing through the high-frequency-to-DC converting means can match a reference signal supplied by reference signal generating means. In order to provide a desired output capacity, a plurality of such power supply blocks are used, with the outputs of the high-frequency-to-DC converting means connected in parallel with each other. The reference signal generating means of the respective power supply blocks maintain the respective reference signals at the equal value by the action of equal-value maintaining means.

For the reference signal generating means each having a terminal at each of its reference potential and output sides, the equal-value maintaining means may include a first line for connecting the reference potential side terminals of the respective reference signal generating means and a second line for connecting the output side terminals of the reference signal generating means.

A plurality of power supply blocks may be at least one pair of power supply blocks. The power supply block pair has a pair of power supply terminals between which first and second AC voltages are selectively applied. The second AC voltage may have a value about two times as large as that of the first AC voltage. Switching means is provided, which operates to connect the inputs of the AC-to-DC converting means of the power supply blocks in parallel between the power supply terminals when the first AC voltage is applied between the power supply terminals, and operates to connect the inputs of the AC-to-DC converting means of the power supply blocks in series between the power supply terminals when the second AC voltage is applied between the power supply terminals.

Alternatively, the switching means may operate to connect the inputs of the DC-to-high-frequency converting means of the power supply block pair in parallel in the output of one of the AC-to-DC converting means of the power supply blocks when the first voltage is applied to that one of the AC-to-DC converting means, and operate to connect the inputs of the DC-to-high-frequency converting means in series in the output of that one of the AC-to-DC converting means of the power supply blocks when the second voltage is applied to that one of the AC-to-DC converting means.

DESCRIPTION OF PREFERRED EMBODIMENTS

Figure 1:
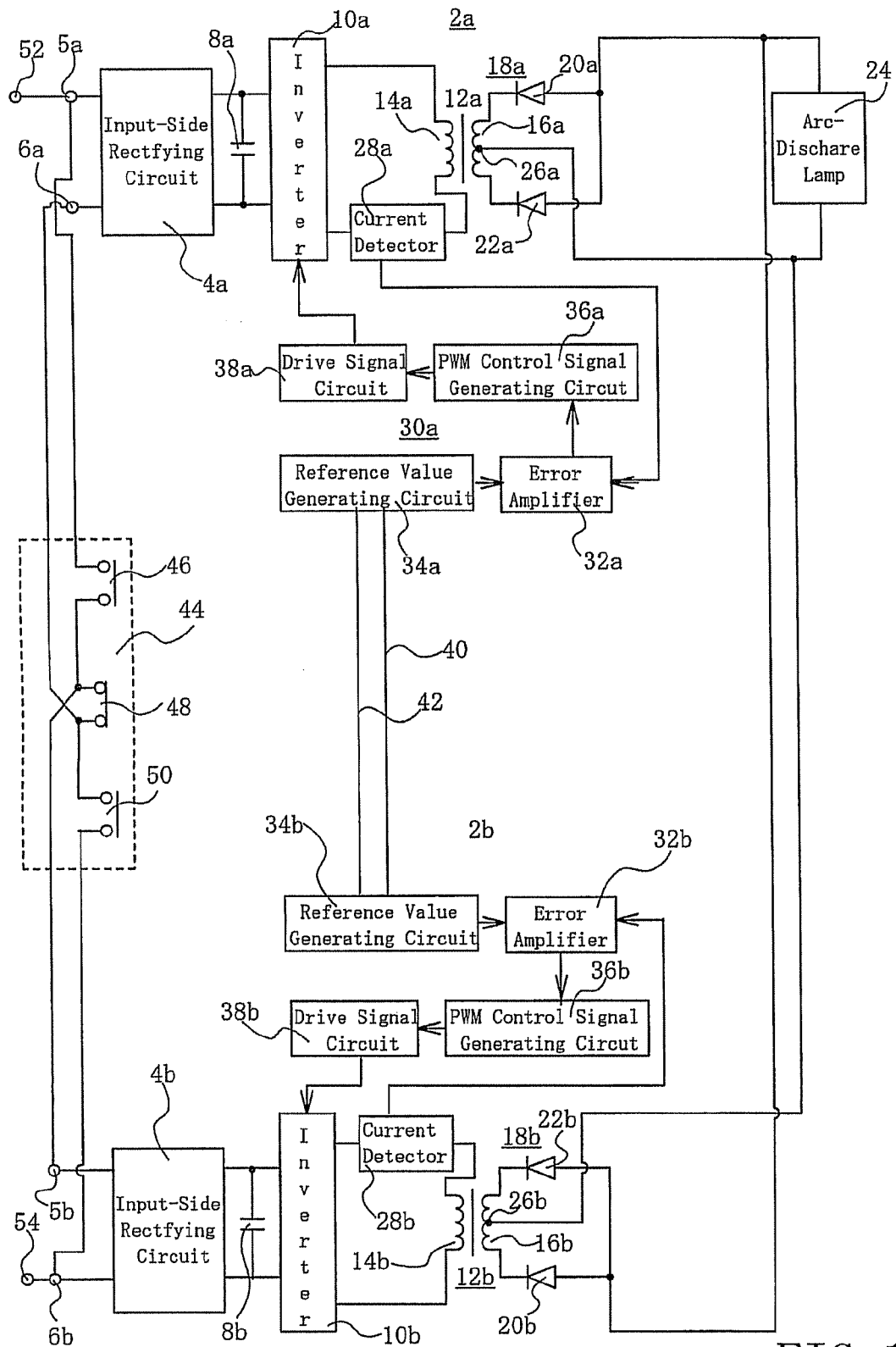
FIG. 1 is a block diagram of a power supply apparatus for arc-utilizing apparatuses according to a first embodiment of the present invention.

As shown in FIG. 1, a power supply apparatus for use with an arc-utilizing apparatus according to a first embodiment of the present invention includes plural, e.g. two, power supply blocks 2a and 2b. The two power supply blocks 2a and 2b have the same output capacity and have the same configuration. Accordingly, in the following description, only one of the power supply blocks, namely, the power supply block 2a, is described in detail, and no detailed description of the other power supply block 2b is given.

It should be noted that letters "a" and "b" are added to the reference numerals for the components of the power supply blocks 2a and 2b, respectively. Thus, a component with a reference numeral with the letter "a" suffixed to it is a component of the power supply block 2a, and a component with a reference numeral with the letter "b" suffixed to it is a component of the power supply block 2b.

The power supply block 2a includes AC-to-DC converting means, e.g. an input-side rectifying circuit 4a. The input-side rectifying circuit 4a full-wave or half-wave rectifies a commercial AC voltage applied between input terminals 5a and 6a thereof. The resulting rectified voltage is smoothed in a capacitor 8a connected between output terminals of the input-side rectifying circuit 4a. The resulting smoothed voltage is applied to DC-to-high-frequency converting means, e.g. an inverter 10a, where it is converted to a high-frequency voltage. The inverter 10a includes a plurality of semiconductor switching devices, e.g. IGBTs, bipolar transistors, or FETs.

The high-frequency voltage from the inverter 10a is applied across a primary winding 14a of a transformer, e.g. a high-frequency transformer 12a. High-frequency-to-DC converting means, e.g. an output-side rectifying circuit 18a, is connected to a secondary winding 16a of the high-frequency transformer 12a. Specifically, the cathode of a rectifying diode 20a of the output-side rectifying circuit 18a is connected to one end of the secondary winding 16a, and the cathode of a rectifying diode 22a is connected to the other end of the secondary winding 16a. The anodes of the diodes 20a and 22a are connected together to a first end of a load, e.g. an arc-discharge lamp 24. The secondary winding 16a has an intermediate tap 26a thereon, which is connected to the other, second end of the arc-discharge lamp 24.

High-frequency current flowing through the primary winding 14a of the high-frequency transformer 12a is detected by a current detector 28a. A current-representative signal representative of the current detected by the current detector 28a is applied to control means, e.g. a control circuit 30a, and, more specifically, to an error amplifier 32a of the control circuit 30a. The error amplifier 32a is also supplied with a reference value signal from a reference value generating circuit 34a of the control circuit 30a. The error amplifier 32a generates an error signal representative of the difference between the current-representative signal and the reference value signal, which error signal is applied to a PWM control signal generating circuit 36a of the control circuit 30a. The PWM control signal generating circuit 36a generates a PWM control signal based on the error signal. The PWM control signal is applied to a drive signal generator 38a, from which it is applied to the respective semiconductor switching devices of the inverter 10a to control the conduction periods of the respective semiconductor switching devices in such a manner as to make the value of the high-frequency current correspond to the reference value signal.

The anodes of rectifying diodes 20b and 22b of the power supply block 2b are connected to the first end of the load, or arc-discharge lamp 24, and an intermediate tap 26b on a secondary winding 16b of a high-frequency transformer 12b is connected to the second end of the arc-discharge lamp 24. It is to be noted that an input-side rectifying circuit 4b of the power supply block 2b is also supplied with the same commercial AC voltage as applied to the input-side rectifying circuit 4a of the power supply block 2a, as will be described later.

As described above, two power supply blocks, namely, the power supply blocks 2a and 2b having the same configuration and capacity are connected in parallel for supplying power to the load 24.

As described above, in order to meet a power capacity requirement posed by a customer, a plurality of power supply blocks having the same capacity are used with their outputs connected in parallel. In such arrangement, it is necessary to balance the magnitudes of power borne by the respective power supply blocks. Usually, the magnitude of power outputted by each power supply block is detected, and the inverter of that power supply block is controlled to make the detected magnitude of power equal to the magnitude of power predetermined to be borne by that power supply block. However, in the present case, since the electrical characteristics of the power supply blocks 2a and 2b having the same configuration can be considered to be substantially the same, it is arranged that the values of current outputted by the inverters 10a and 10b are detected, and the inverters 10a and 10b are so controlled to make the detected current values equal to a predetermined reference value, which is same for both of the power supply blocks 2a and 2b.

In this arrangement, therefore, there is no need to send and receive a signal for controlling the inverters 10a and 10b between the power supply blocks 2a and 2b. Further, if one of the power supply blocks 2a and 2b breaks down, the operation of the power supply apparatus can be resumed by replacing the broken power supply block with a new one.

In this case, if the reference value signals from the reference value generating circuits 34a and 34b of the power supply blocks 2a and 2b should have different values, the magnitudes of the output power of the power supply blocks 2a and 2b will become different. In order to prevent it, according to the present embodiment, equal-value maintaining means is connected between the reference value generating circuits 34a and 34b. The equal-value maintaining means may include first and second lines, e.g. equipotential lines 40 and 42.

Figure 2:
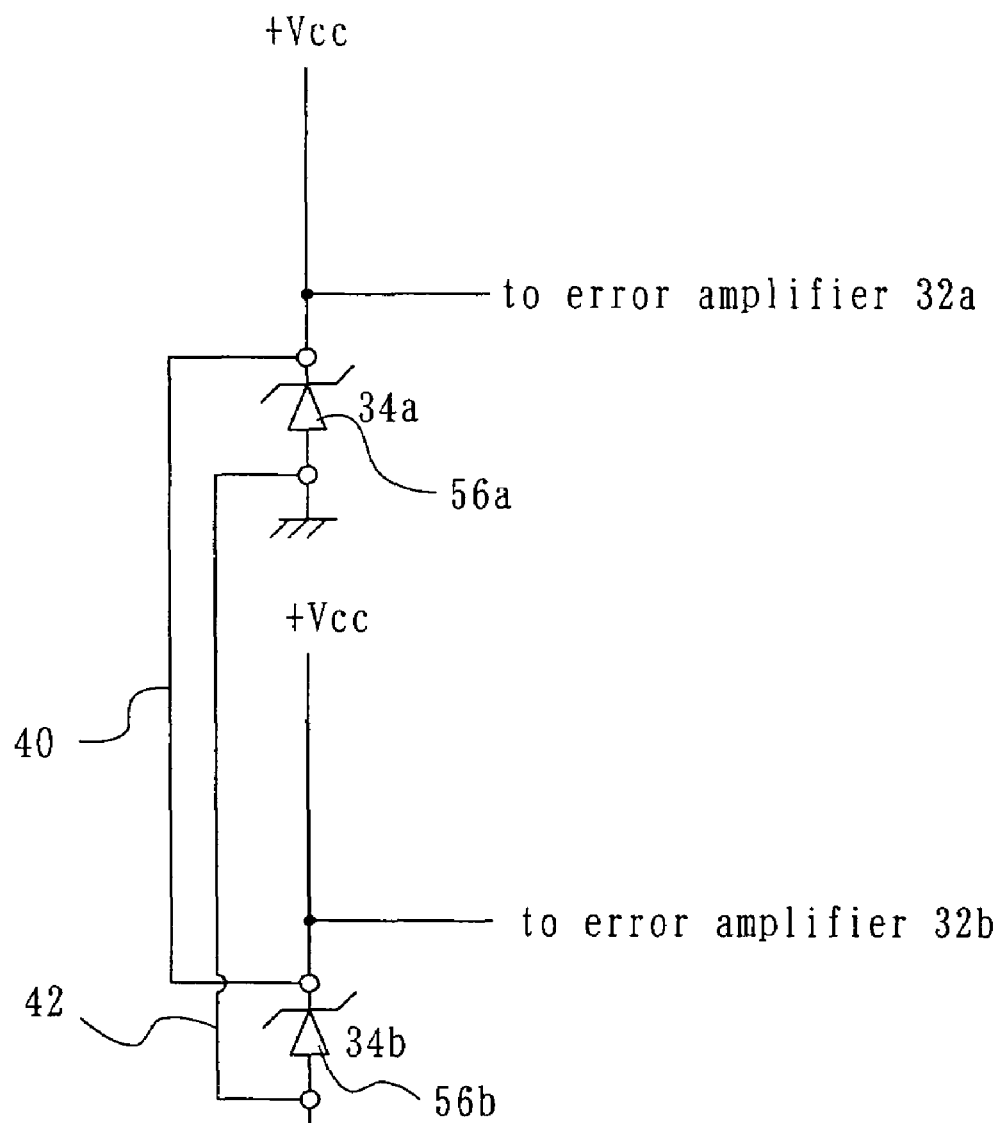
FIG. 2 is a block diagram of a reference signal generating section of the power supply apparatus of FIG. 1.

Specifically, as shown in FIG. 2, the reference value generating circuits 34a and 34b include zener diodes 56a and 56b, respectively, whose cathodes are supplied with a +Vcc DC voltage, and whose anodes are coupled to a reference potential, e.g. the ground potential. The cathode-anode voltages are applied to the error amplifiers 32a and 32b, as the reference value signals. The cathodes of the zener diodes 56a and 56b are coupled together via the equipotential line 40, and the anodes are coupled together via the equipotential line 42.

By virtue of this arrangement, the cathode-anode voltage of the zener diode 56a and the cathode-anode voltage of the zener diode 56b become exactly equal to each other. Accordingly, the power supply blocks 2a and 2b output the same magnitude of power.

In the described embodiment, the values of the high-frequency current of the inverters 10a and 10b are detected. One may consider detecting the DC currents from the output-side rectifying circuits 18a and 18b, but such DC currents have a large magnitude, and, therefore, it is necessary to use large current detectors to detect such current. In contrast, the high-frequency current from each of the inverters 10a and 10b is smaller, and, therefore, the AC current detectors 28a and 28b can be of smaller capacity.

The commercial AC voltage applied to the input-side rectifying circuits 4a and 4b may be either one of a first commercial AC voltage and a second commercial AC voltage having a magnitude about two times as large as the first AC voltage. The first commercial AC voltage may be of 100 V, for example, and the second commercial AC voltage may be of 200 V, in some areas where the power supply apparatus is used. In order for the power supply apparatus to be able to deal with either one of the voltages applied thereto, a voltage switching circuit 44 is connected between the input terminals 5a, 6a and the input terminals 5b, 6b (FIG. 1) according to the present invention.

Specifically, the input terminal 5a is connected to the input terminal 6b via a series combination of a normally open switch 46, a normally closed switch 48 and a normally open switch 50 of the voltage switching circuit 44. The junction of the normally closed switch 48 and the normally open switch 50 is connected to the input terminal 6a, and the junction of the normally closed switch 48 and the normally open switch 46 is connected to the input terminal 5b. The switches 46, 48 and 50 are operated together in such a manner that, when the normally open switches 46 and 50 are opened, the normally closed switch 48 is closed, and, when the normally open switches 46 and 50 are closed, the normally closed switch 48 is opened.

The input terminal 5a is connected to a power supply terminal 52, and the input terminal 6b is connected to a power supply terminal 54. A commercial AC voltage is applied between these power supply terminals 52 and 54. The normally open switches 46 and 50 and the normally closed switch 48 may be mechanical switches, or they may be formed of semiconductor switching devices. These switches may be manually opened and closed. Alternatively, it may be arranged that the voltage between the power supply terminals 52 and 54 is detected by a voltage detector, and the switches may be opened and closed automatically in accordance with the value of the detected voltage.

When a commercial AC voltage of 200 V is applied between the power supply terminals 52 and 54, the normally open switches 46 and 50 are opened, and the normally closed switch 46 is closed. This causes the input-side rectifying circuits 4a and 4b to be connected in series between the power supply terminals 52 and 54, so that a voltage of 100 V is applied to each of the input-side rectifying circuits 4a and 4b. When the voltage applied between the power supply terminals 52 and 54 is 100 V, the normally open switches 46 and 50 are closed, and the normally closed switch 48 is opened. This causes the input-side rectifying circuits 4a and 4b to be connected in parallel between the power supply terminals 52 and 54, so that both of the voltages applied to the input-side rectifying circuits 4a and 4b are 100 V.

With the use of the voltage switching circuit 44, the power supply apparatus can be used either in an area where a commercial AC voltage having a magnitude of 100 V is used or in an area where a commercial AC voltage having a magnitude of 200 V is used.

Figure 3:
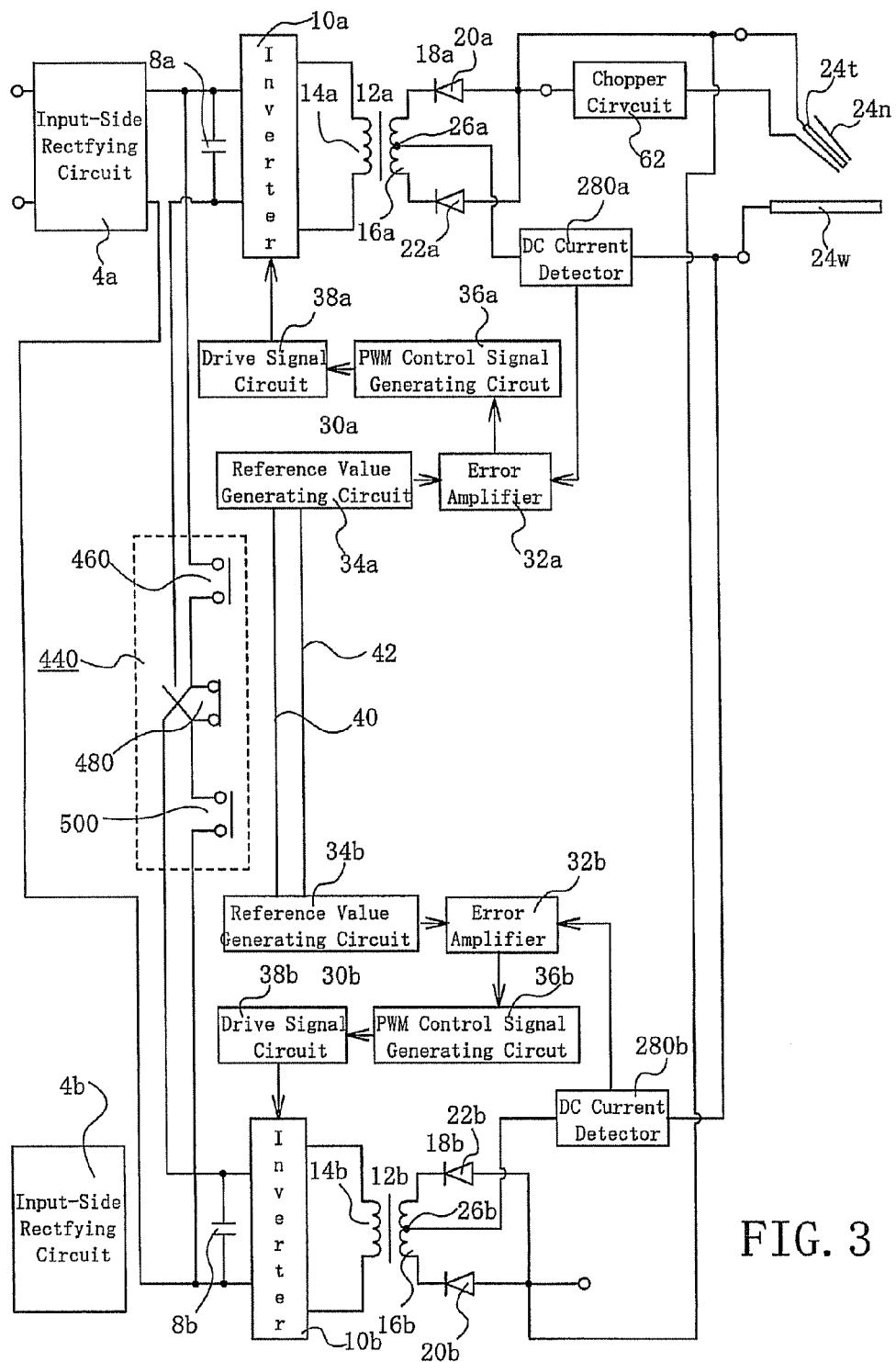
FIG. 3 is a block diagram of a power supply apparatus for arc-utilizing apparatuses according to a second embodiment of the present invention.

A power supply apparatus according to a second embodiment is shown in FIG. 3. The power supply apparatus of FIG. 3 is used with an arc welder. This power supply apparatus has substantially the same configuration as the power supply apparatus according to the first embodiment. Accordingly, the same reference numerals and suffixes are used for components and functions same as or similar to the ones of the first embodiment, and their detailed description is not given.

The power supply apparatus is for use with an arc welder, and, therefore, the intermediate taps 26a and 26b on the secondary windings 16a and 16b of the high-frequency transformers 12a and 12b, respectively, are connected to a workpiece 24w. The junction of the rectifying diodes 20a and 22a of the output-side rectifying circuit 18a and the junction of the rectifying diodes 20b and 22b of the output-side rectifying circuit 18b are connected together to a torch 24t of the welder. The voltage at the junction of the rectifying diodes 20a and 20b is boosted in a chopper circuit 62, and the boosted voltage is applied to a nozzle 24n surrounding the torch 24t of the welder to cause a pilot arc to be generated between the torch 24t and the nozzle 24n so that arcing can be successfully initiated.

It should be noted that terminals for connection to the chopper circuit and to the torch can be provided at the junction where the anodes of the two rectifying diodes of the output-side rectifying circuit of each power supply block, so that the chopper circuit 62 can be connected to any of the power supply block.

DC current detectors 280a and 280b are disposed between the intermediate tap 26a and the workpiece 24w and between the intermediate tap 26b and the workpiece 24w, respectively, and DC-current representative signals representative of the DC currents detected by the DC current detectors 280a and 280b are applied to the error amplifiers 32a and 32b, respectively.

A voltage switching circuit 440 is connected between the output of the input-side rectifying circuit 4a and the smoothing capacitors 8a and 8b. Any switches can be used as a normally open switches 460 and 500 and a normally closed switch 480, if they can turn on and off a DC voltage, and, therefore, they can cost less than the normally open switch 46 and 50 and the normally closed switch 48 of the first embodiment, which must turn on and off an AC voltage. In the present embodiment, the input-side rectifying circuit 4b of the power supply block 2b is not used.

When the commercial AC voltage is a 100 V voltage, the inverters 10a and 10b are connected in parallel between the output terminals of the input-side rectifying circuit 4a, and when the commercial AC voltage is of 200 V, the inverters 10a and 10b are connected in series between the output terminals of the input-side rectifying circuit 4a. Thus, the input-side rectifying circuit 4a is arranged to be capable of rectifying a voltage of either 100 V or 200 V.

When the commercial AC voltage applied is of 100 V, the inverters 10a and 10b are connected in parallel, and, therefore, the input voltages to the inverters 10a and 10b are equal. Accordingly, it is impossible to make equal the magnitudes of the output power provided by the power supply blocks 2a and 2b by detecting the voltages of the inverters 10a and 10b and controlling the inverters 10a and 10b in accordance with the detected voltages. In this case, the arrangement of detecting the currents flowing through the secondary windings 16a and 16b of the high-frequency transformers 12a and 12b by the current detectors 280a and 280b and controlling the inverters 10a and 10b in accordance with the detected currents gives full play.

According to the above-described two embodiments of the present invention, two power supply blocks are used, but more than two power supply blocks may be used, depending on power capacity required by a user. In such case, an even number of power supply blocks, which can operate from either of two different commercial AC voltages by the action of the voltage switching circuit 44 or 440, are prepared, with two of such power supply blocks used to form one power supply unit like the ones of the above-described embodiments, and, then, such power supply units are connected in parallel between the power supply terminals.

What is claimed is:

1. A power supply apparatus for use with an arc-utilizing apparatus, comprising:
   a plurality power supply blocks having the same capacity, each of said power supply blocks comprising:
   AC-to-DC converting means for converting commercial AC power to DC power; DC-to-high-frequency converting means for converting the resulting DC power to high-frequency power; a transformer for transforming the resulting high-frequency power; high-frequency-to-DC converting means for converting the resulting transformed high-frequency power to DC power; and control means for controlling high-frequency current flowing through said DC-to-high-frequency converting means or current flowing through said high-frequency-to-DC converting means in such a manner as to make said current correspond to a reference signal from reference signal generating means;

said high-frequency-to-DC converting means of said respective power supply blocks having their outputs connected in parallel; said reference signals provided by said reference signal generating means of said respective power supply blocks being kept equal to each other by means of equal-value maintaining means, wherein each of said reference signal generating means has a reference-potential-side terminal and an output-side terminal; and said equal-value maintaining means comprises a first line connecting said reference-potential-side terminals together and a second line connecting said output-side terminals together.

2. A power supply apparatus for use with an arc-utilizing apparatus, comprising:

a plurality power supply blocks having the same capacity, each of said power supply blocks comprising:

AC-to-DC converting means for converting commercial AC power to DC power; DC-to-high-frequency converting means for converting the resulting DC power to high-frequency power; a transformer for transforming the resulting high-frequency power; high-frequency-to-DC converting means for converting the resulting transformed high-frequency power to DC power; and control means for controlling high-frequency current flowing through said DC-to-high-frequency converting means or current flowing through said high-frequency-to-DC converting means in such a manner as to make said current correspond to a reference signal from reference signal generating means;

said high-frequency-to-DC converting means of said respective power supply blocks having their outputs connected in parallel; said reference signals provided by said reference signal generating means of said respective power supply blocks being kept equal to each other by means of equal-value maintaining means, wherein at least one pair of said power supply blocks is used, said at least one pair of power supply blocks having a pair of power supply terminals between which either a first AC voltage or a second AC voltage having a magnitude about two times as large as the magnitude of said first AC voltage is applied; said power supply apparatus further comprising switching means for connecting the input sides of said AC-to-DC converting means of said at least one pair of power supply blocks in parallel between said pair of power supply terminals when said first AC voltage is applied between said pair of power supply terminals, and connecting the input sides of said AC-to-DC converting means of said at least one pair of power supply blocks in series between said pair of power supply terminals when said second voltage is applied between said pair of power supply terminals.

3. A power supply apparatus for use with an arc-utilizing apparatus, comprising:

a plurality power supply blocks having the same capacity, each of said power supply blocks comprising:

AC-to-DC converting means for converting commercial AC power to DC power; DC-to-high-frequency converting means for converting the resulting DC power to high-frequency power; a transformer for transforming the resulting high-frequency power; high-frequency-to-DC converting means for converting the resulting transformed high-frequency power to DC power; and control means for controlling high-frequency current flowing through said DC-to-high-frequency converting means or current flowing through said high-frequency-to-DC converting means in such a manner as to make said current correspond to a reference signal from reference signal generating means;

said high-frequency-to-DC converting means of said respective power supply blocks having their outputs connected in parallel; said reference signals provided by said reference signal generating means of said respective power supply blocks being kept equal to each other by means of equal-value maintaining means, wherein at least one pair of power supply blocks are used; said power supply apparatus further comprising switching means for connecting the input sides of said DC-to-high-frequency converting means of said at least one pair of power supply blocks in parallel in the output of said AC-to-DC converting means of one of said power supply blocks when a first voltage is applied to said AC-to-DC converting means of said one of said power supply blocks, and connecting the input sides of said DC-to-high-frequency converting means of said at least one pair of power supply blocks in series in the output of said AC-to-DC converting means of said one of said power supply blocks when a second voltage about two times as large as said first voltage is applied to said AC-to-DC converting means of said one of said power supply blocks.

* * * * *

UNITED STATES PATENT AND TRADEMARK OFFICE
CERTIFICATE OF CORRECTION

PATENT NO.         : 7,457,139 B2  
APPLICATION NO. : 11/384845  
DATED                 : November 25, 2008  
INVENTOR(S)       : Hideo Ishii et al.

Page 1 of 1

It is certified that error appears in the above-identified patent and that said Letters Patent is hereby corrected as shown below:

Cover Page, item (75) Inventors:, delete "Isii" and insert therefor --Ishii--

Signed and Sealed this

Twentieth Day of January, 2009

JON W. DUDAS  
*Director of the United States Patent and Trademark Office*